United States Patent
Dutta et al.

(10) Patent No.: US 9,914,883 B2
(45) Date of Patent: Mar. 13, 2018

(54) PROCESSES FOR PRODUCING A TRANSPORTATION FUEL FROM A RENEWABLE FEEDSTOCK

(71) Applicant: UOP LLC, Des Plaines, IL (US)

(72) Inventors: Kanchan Dutta, Kolkata (IN); Avnish Kumar, Alwar (IN); Krishna Mani, Gurgaon (IN); Anjan Ray, New Delhi (IN)

(73) Assignee: UOP LLC, Des Plaines, IL (US)

(*) Notice: Subject to any disclaimer, the term of this patent is extended or adjusted under 35 U.S.C. 154(b) by 323 days.

(21) Appl. No.: 14/677,530

(22) Filed: Apr. 2, 2015

(65) Prior Publication Data

US 2016/0289568 A1    Oct. 6, 2016

(51) Int. Cl.
  C10G 45/58    (2006.01)
  C10L 1/02     (2006.01)
  C10G 3/00     (2006.01)
  C10L 1/08     (2006.01)

(52) U.S. Cl.
  CPC ............ *C10G 45/58* (2013.01); *C10G 3/42* (2013.01); *C10G 3/50* (2013.01); *C10L 1/08* (2013.01); *C10G 2400/04* (2013.01); *C10L 2200/0469* (2013.01); *C10L 2270/026* (2013.01); *C10L 2290/10* (2013.01); *C10L 2290/24* (2013.01); *Y02E 50/13* (2013.01); *Y02P 30/20* (2015.11)

(58) Field of Classification Search
  None
  See application file for complete search history.

(56) References Cited

U.S. PATENT DOCUMENTS

| 2004/0230085 A1* | 11/2004 | Jakkula ............... C10G 3/45 585/240 |
| 2009/0288336 A1* | 11/2009 | Sugano ............... C10L 1/08 44/347 |
| 2013/0149755 A1 | 6/2013 | Reed et al. |
| 2013/0199481 A1 | 8/2013 | Rantanen-Kolehmainen et al. |

(Continued)

FOREIGN PATENT DOCUMENTS

| EP | 2177587 A1 | 4/2010 |
| WO | WO 2010/043765 A1 | 4/2010 |

OTHER PUBLICATIONS

Tanneru et al., "Production of transportation fuels range hydrocarbons from pyrolysis oil . . . ," AICHE Annual Meeting, Nov. 3-8, 2013, pp. 1-9.

(Continued)

*Primary Examiner* — Tam M Nguyen

(57) ABSTRACT

Processes for the production of transportation fuel from a renewable feedstock. A gaseous mixture of carbon monoxide and hydrogen is used to deoxygenate and hydrogenate the glycerides to produce long chain hydrocarbons. The hydrocarbons may be isomerized to improve cold flow properties to provide a diesel fuel. Prior to isomerization, the long chain hydrocarbons can be separated or the separation can be after isomerization. Recycle gas streams from the isomerization and the deoxygenation and hydrogenation reactions may be used to supply at least a portion of the gaseous mixture of carbon monoxide and hydrogen. Synthesis gas may also be used to supply at least a portion of the gaseous mixture of carbon monoxide and hydrogen.

19 Claims, 2 Drawing Sheets

(56) References Cited

U.S. PATENT DOCUMENTS

Figure 1:
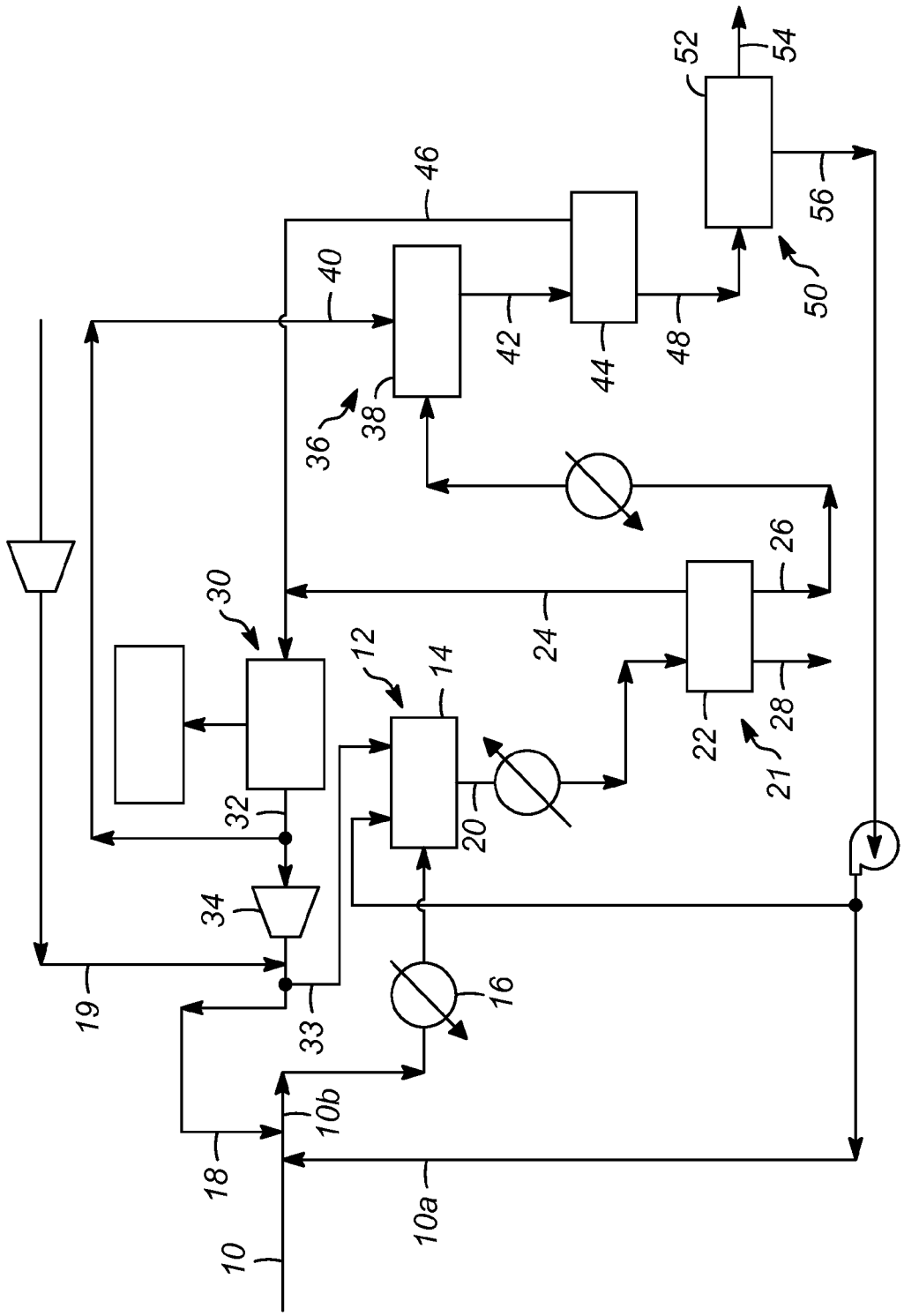

2013/0291431 A1    11/2013    Steele et al.

OTHER PUBLICATIONS

Ni et al., "Pyrococcus furiosus-mediated reduction of conjugated carboxylic acids . . . ," Journal of Molecular Catalysis B: Enzymatic (2014), 103, 52-55.
Street, et al, "Gasoline-range hydrocarbon production using biomass derived synthesis gas over Mo/H+ZSM-5", Fuel 96 (2012), p. 239-249.

* cited by examiner

PROCESSES FOR PRODUCING A TRANSPORTATION FUEL FROM A RENEWABLE FEEDSTOCK

FIELD OF THE INVENTION

This invention relates generally to processes for the conversion of oils from a renewable feedstock to diesel fuel and more particularly to processes which minimize the consumption of high purity hydrogen in such processes.

BACKGROUND OF THE INVENTION

The use of biofuels is becoming more and more popular around the world especially based upon concerns from limited petroleum resources, increasing energy demand, greenhouse gas emissions and related climate change concerns. In addition to producing petroleum derived fuels, the fuels can also be manufactured using carbon and hydrogen derived from organic biomass, such as vegetable oils, organic fats, and organic greases.

For example, biological oils and fats can be converted into diesel, naphtha and jet fuels using many different processes, such as hydrodeoxygenation and hydro-isomerization processes. Diesel fuel refers to a mixture of carbon chains that generally contain between 8 and 21 carbon atoms per molecule. Typically, diesel has a boiling point in the range of 180 to 380° C. (356 to 716° F.). The production of diesel fuel can be either petroleum-derived or biologically-sourced. Petroleum-derived diesel is produced from the fractional distillation of crude oil, refining products, or by conversion processes. On the other hand, biologically-sourced diesel fuel is derived from renewable feedstock, such as vegetable oils or animal fats.

The biologically-sourced diesel fuel is desirable for a variety of reasons. In addition to the ecological benefits of using biologically-sourced diesel fuel, there exists a market demand for such fuel. For diesel purchasers, the use of biologically-sourced diesel fuel can be promoted in public relations. Also, certain governmental policies may require or reward use of biologically-sourced fuels. Finally, fluctuation of crude oil prices is also a reason refiners may choose to produce biologically-sourced fuels. The biologically-sourced diesel fuel is usually classified into two categories, biodiesel and green diesel.

Biodiesel (also referred to as fatty acid methyl ester, or FAME) mainly consists of long-chain alkyl esters typically mono-alkyl ester products derived from a lipid feedstock. The chemical structure of biodiesel is distinctly different from petroleum-derived diesel, and therefore biodiesel has somewhat different physical and chemical properties from petroleum-derived diesel. For example, biodiesel has a much higher oxygen content than petroleum-derived diesel.

Green diesel (also referred to as renewable hydrocarbon diesel, hydroprocessed vegetable oils or HVO), on the other hand, is substantially the same chemically as petroleum-derived diesel, but green diesel is made from recently living biomass. Unlike biodiesel, which is an ester and has different chemical properties from petroleum diesel, green diesel is composed of long-chain hydrocarbons, and can be mixed with petroleum diesel in any proportion for use as transportation fuel. Green diesel resembles petroleum-derived diesel fuel and usually has a very low heteroatom (nitrogen, oxygen, sulfur) content. Green diesel can thus be produced to be indistinguishable from petroleum diesel. This is beneficial because no changes to fuel infrastructure or vehicle technology are required for green diesel and it may be blended in any proportion with petroleum-derived diesel fuel as it is stable, not oxygenated. Further, unlike FAME biodiesel technology which produces glycerin as a byproduct, the production of green diesel generates valuable co-products like naphtha, liquefied petroleum gas components like propane and butane, and fuel gases like methane and ethane.

The production of green diesel from some biomasses, such as vegetable oils, consumes large amounts of hydrogen. In some areas, hydrogen is not abundantly available and therefore, reactions that require large amounts of hydrogen may be economically unviable. However, even if areas in which hydrogen is available, the required hydrogen is an added cost for a refiner. In addition to having high hydrogen demands, the decarboxylation, decarbonylation, and hydrodeoxygenation reactions associated with converting the triglycerides found in the oils into paraffins typically produce large amounts of water. Water can be a poison for many isomerization catalysts, such as the catalysts typically used to upgrade the cold flow properties of a diesel fuel.

Therefore, it would be desirable to have one or more processes that allow for effective and efficient conversion of triglycerides into paraffins which have a lower hydrogen demand. Furthermore, it would also be desirable to provide lower water production to minimize separation issues associated with water-sensitive catalysts downstream of the oxygen removal step.

SUMMARY OF THE INVENTION

One or more processes have been invented for producing a transportation fuel from a biomass oil in which carbon monoxide is used as a reducing agent along with hydrogen. By utilizing carbon monoxide, the amount of hydrogen necessary for the conversion reactions is lowered, and the inclusion of some hydrogen will ensure proper saturation of any double bonds. Further by using less hydrogen, less water will be produced. Moreover, any water produced will react with carbon monoxide to produce hydrogen gas. Finally, such lower-purity hydrogen mixed with carbon monoxide can be obtained by existing methods that cost significantly less than production of high-purity hydrogen.

Therefore, in a first aspect of the invention, the present invention may be broadly characterized as providing a process for producing a transportation fuel from a renewable feedstock by: passing a liquid stream comprising oil or fat or fatty acid derived from a biomass to a reaction zone; passing a gaseous stream to the reaction zone, the gaseous stream comprising a mixture of hydrogen and carbon monoxide; operating the reaction zone under conditions to remove oxygen from the oil and to hydrogenate the oil to provide an effluent; and, isomerizing at least a portion of the effluent to increase a cold flow property of the at least a portion of the effluent.

In at least one embodiment of the present invention, the gaseous stream comprises a molar ratio of hydrogen to carbon monoxide of between 50:50 to 99:1.

In some embodiments of the present invention, the gaseous stream comprises a molar ratio of hydrogen to carbon monoxide of between 50:50 to 80:20.

In one or more embodiments of the present invention, the gaseous stream comprises synthesis gas. It is contemplated that the synthesis gas may be produced from a biomass, such as but not limited to steam reforming of biologically generated methane, direct gasification of biomass or gasification of charcoal or coke derived from biomass.

In at least one embodiment of the present invention, the gaseous stream comprises a steel production gaseous stream.

In various embodiments of the present invention, the gaseous stream comprises a refinery gas stream.

In some embodiments of the present invention, the transportation fuel comprises green diesel.

In a second aspect of the invention, the present invention may be broadly characterized as providing a process for producing a transportation fuel from a renewable feedstock by: passing a renewable feedstock to a deoxygenation zone, the renewable feedstock comprising vegetable oil; passing a gaseous stream to the deoxygenation zone, the gaseous stream comprising a mixture of hydrogen and carbon monoxide; deoxygenating the renewable feedstock in the deoxygenation zone to remove oxygen from the vegetable oil and to hydrogenate the vegetable oil and to provide a deoxygenated effluent; separating the deoxygenated effluent into a recycle gas and a liquid effluent, wherein the recycle gas forms a portion of the gaseous stream; isomerizing at least a portion of the liquid effluent to provide an isomerized effluent; and, separating a transportation fuel from at least a portion of the isomerized effluent.

In at least one embodiment of the present invention, the gaseous stream comprises a molar ratio of hydrogen to carbon monoxide of between 50:50 to 99:1.

In various embodiments of the present invention, the process includes separating the liquid effluent into a heavy effluent and a light effluent, the light effluent comprising the portion of the liquid effluent that is isomerized. It is contemplated that the process further includes mixing at least a portion of the heavy effluent with the renewable feedstock to form a combined feed. It is also contemplated that the process includes quenching the deoxygenation zone with at least a portion of the heavy effluent or with a portion of a recycle gas stream, or both.

In one or more embodiments of the present invention, the process includes separating the isomerized effluent into a second recycle gas stream and a liquid isomerized effluent, wherein the second recycle gas forms a portion of the gaseous stream. It is contemplated that the process further includes separating the liquid isomerized effluent into a product and a bottoms, wherein the product comprises a transportation fuel. It is also contemplated that the process includes mixing at least a portion of the bottoms with the renewable feedstock to form a combined feed. It is even further contemplated that the process includes further comprising: quenching the deoxygenation zone with at least a portion of the bottoms or with a portion of a recycle gas stream, or both.

In various embodiments of the present invention, the process includes removing carbon dioxide from the recycle gas to provide a carbon dioxide lean gaseous stream, wherein the carbon dioxide lean gaseous stream forms a portion of the gaseous stream. It is contemplated that the process further includes passing a portion of the carbon dioxide lean gaseous stream to an isomerization zone, and, isomerizing at least a portion of the liquid effluent to increase a cold flow property of the at least a portion of the liquid effluent in the isomerization zone to provide an isomerized effluent.

In various embodiments of the present invention, at least a portion of the gaseous stream comprises synthesis gas.

It should be appreciated and understood that the above aspects and embodiments may be combinable in any manner.

Additional aspects, embodiments, and details of the invention which may be combined in any manner are set forth in the following detailed description of the invention.

DETAILED DESCRIPTION OF THE DRAWINGS

Figure 2:
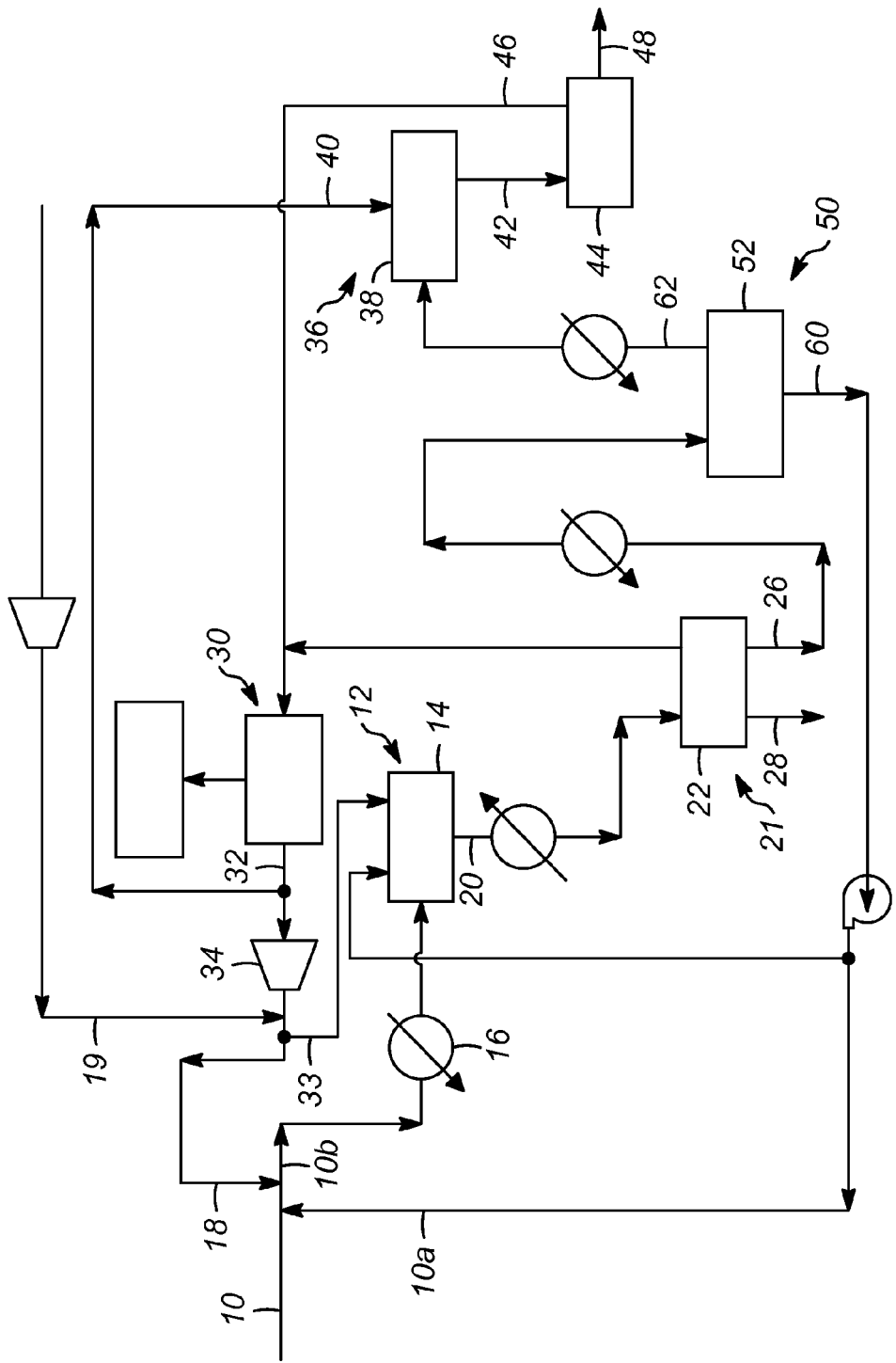

In the drawings:

FIG. 1 shows a process flow diagram according to one or more embodiments of the present invention; and, FIG. 2 shows another process flow diagram of one or more embodiments of the present invention.

DETAILED DESCRIPTION OF THE INVENTION

As mentioned above, the present invention provides one or more processes for producing a transportation fuel, such as diesel fuel, from renewable sources. These renewable sources include, but are not limited to, plant oils such as corn, rapeseed, canola, soybean and algal oils, animal fats such as tallow, fish oils and various waste streams such as yellow and brown greases, dairy sludge, used or recycled cooking oil, by-products from edible oil refining such as palm stearin or palm fatty acid distillate or recovered oils from spent bleaching earth, and sewage sludge. The common feature of these sources is that they are composed of glycerides and Free Fatty Acids (FFA). Both of these classes of compounds contain aliphatic carbon chains having from 8 to 24 carbon atoms. The aliphatic carbon chains in the glycerides or FFAs can be saturated or mono-, di- or poly-unsaturated. The term renewable feedstock is meant to include feedstocks other than those derived from petroleum crude oil. The renewable feedstocks that can be used in the present invention include any of those which comprise glycerides and FFAs. Most of the glycerides will be triglycerides, but monoglycerides and diglycerides may be present and processed as well. Examples of these renewable feedstocks include, but are not limited to, canola oil, corn oil, soy oils, rapeseed oil, soybean oil, colza oil, tall oil, sunflower oil, hempseed oil, olive oil, linseed oil, coconut oil, castor oil, peanut oil, palm oil, mustard oil, tallow, yellow and brown greases, lard, train oil, jatropha oil, fats in milk, fish oil, algal oil, sewage sludge, and the like. Additional examples of renewable feedstocks include non-edible vegetable oils from the group comprising Jatropha curcas (Ratanjoy, Wild Castor, Jangli Erandi), Madhuca indica (Mohuwa), Pongamia pinnata (Karanji Honge), and Azadiracta indicia (Neem). The glycerides and FFAs of the typical vegetable or animal fat contain aliphatic hydrocarbon chains in their structure which have 8 to 24 carbon atoms with a majority of the fats and oils containing high concentrations of fatty acids with 16 and 18 carbon atoms.

Vegetable oils are long chain esters of fatty acids with glycerol. Three main reactions are involved in producing the n-paraffin in presence of hydrogen for jet/diesel production are:

(Decarboxylation) $C_nH_{2n+1}COOR + H_2 = C_nH_{2n+2} + CO_2 + RH$;

(Decarbonylation) $C_nH_{2n+1}COOR + 2H_2 = C_nH_{2n+2} + CO + H_2O + RH$;

and, (Hydrodeoxygenation) $C_nH_{2n+1}COOR + 4H_2 = C_{n+1}H_{2(n+2)} + 2H_2O + RH$.

As will be appreciated from the reactions above, the decarbonylation and hydrodeoxygenation reactions consume a significant portion of the hydrogen for the conversion of the fatty acids in glycerides. Additionally, these reactions produce water which may act as a poison for certain downstream catalysts. In contrast to hydrogen, it is known to use carbon monoxide as a reducing agent to remove oxygen atoms from the fatty acids in glycerides. See, EP 2 177 587. While the carbon monoxide may function to remove the oxygen atoms from the fatty acids, the lack of hydrogen will result in the production of unsaturated hydrocarbons. This can lead the oligomerization and adversely impact product quality and foul production lines. However, it has been discovered that processes to produce transportation fuel from a renewable resource can utilize a mixture of hydrogen and carbon monoxide to convert the components of a renewable feedstock to transportation fuel. In addition to requiring less hydrogen, the processes will produce minimal amounts of water. Thus, the use of a mixture of hydrogen and carbon monoxide to convert glycerides to long chain hydrocarbons will require less hydrogen and will produce less undesired byproduct.

With these general principles in mind, one or more embodiments of the present invention will be described with the understanding that the following description is not intended to be limiting.

As shown in FIG. 1, a renewable feedstock 10 is passed to a first reaction zone 12 comprising one or more catalyst beds in one or more reactors 14. The term "feedstock" is meant to include feedstocks that have not been treated to remove contaminants as well as those feedstocks purified in a pretreatment zone (not shown). The feedstock 10 is preferably heated, for example in a heat exchanger 16, prior to entering the reactor 14. Additionally, the feedstock 10 may be combined with a partially uncovered stream 10a (discussed below) to form a combined feedstock 10b.

In addition to the feedstock 10, a gaseous stream 18 is also passed to the reactor 14 of the first reaction zone 12. The gaseous stream 18 comprises a mixture of carbon monoxide and hydrogen. The gaseous stream 18 may comprise one or more recycle gas streams (discussed below) as well as a makeup stream 19 from a source of carbon monoxide and hydrogen. The makeup stream 19 may comprise synthesis gas. The synthesis gas may be obtained from the gasification of coal or coke or from the steam reforming of methane. Additionally and alternatively, the synthesis gas may be obtained from the gasification of biomass, including municipal solid waste, plant residues from agriculture or forestry or aquatic organisms. However, as such a process produces nitrogen gas, it is unknown what, if any, impact the nitrogen will have, for example, forming ammonia in the system. Therefore, it is preferable that the synthesis gas is nitrogen free. This may be accomplished by biomass catalyst partial oxidation or by air separation to remove nitrogen upstream of the gasifier.

Another potential source of carbon monoxide and hydrogen for the gaseous stream 18 is from a steel production processes which typically dispose of large volumes of specialty gases. In steel production, three different process stages, from coal to steel, provide three different gas types: coke gas, blast furnace gas and converter gas. Coke gas comprises between 50 to 70 mol-% hydrogen, 25 to 30 mol-% methane, 10 to 20 mol-% of carbon monoxide, and small amounts of carbon dioxide and nitrogen. Blast furnace gas comprises about 20 mol-% carbon monoxide and about 5 mol-% hydrogen. Converter gas comprises about 65 mol-% carbon monoxide with small amount of hydrogen, 15 mol-% carbon dioxide, and 15 mol-% nitrogen. Another potential source of carbon monoxide and hydrogen is from an FCC off gas and refinery off gas stream. Both of these streams may have carbon monoxide and hydrogen.

Additionally, yet another source of carbon monoxide and hydrogen for gaseous stream 18 may be a refinery gas stream such as a stream from downstream of a reformer and upstream of a shift reactor. Typically such gas comprises about 70% hydrogen and 20% carbon monoxide and the balance of carbon dioxide and methane. Such a gas may not require acid gas/nitrogen gas removal. In addition to the preferred removal of nitrogen gas and even though carbon dioxide is inert, the effect of the carbon dioxide on the catalyst is unclear. Accordingly, it is preferred that the gas is treated to remove carbon dioxide as well. Utilizing an off gas or gas stream from such refinery processes is beneficial because such streams are readily available and cost effective source of the gaseous stream in the processes of the present invention. Additionally the utilization of such a gaseous stream will minimize the amount of gas passed to a PSA unit. Indeed, as the present invention utilizes a gaseous stream having a mixture of hydrogen and carbon monoxide, there is no need to obtain pure (i.e., >99.999% hydrogen) gas.

Returning to FIG. 1, in the reaction first zone 12, the feedstock 10 is contacted with a hydrogenation or hydrotreating catalyst in the presence of hydrogen and carbon monoxide at hydrogenation conditions to hydrogenate the olefinic or unsaturated portions of the n-paraffinic chains. Hydrogenation conditions include a temperature of 100 to 500° C. (212 to 932° F.) and a pressure of 689 kPa absolute (100 psia) to 13,790 kPa absolute (2000 psia). In another embodiment the hydrogenation conditions include a temperature of 200 to 300° C. (392 to 572° F.) and a pressure of 1379 kPa absolute (200 psia) to 4826 kPa absolute (700 psia). Other operating conditions for the hydrogenation zone are well known in the art.

Hydrogenation or hydrotreating catalysts are any of those well known in the art such as nickel, nickel/molybdenum, cobalt/molybdenum dispersed on a high surface area support. Other hydrogenation or hydrotreating catalysts include one or more noble metal catalytic elements dispersed on a high surface area support. Non-limiting examples of noble metals include Pt and/or Pd dispersed on gamma-alumina. These hydrogenation or hydrotreating catalysts are also capable of catalyzing decarboxylation and/or deoxygenation of the feedstock to remove oxygen from the gylcerols. In the present case, it is believed that cobalt/molybdenum may be desirable because cobalt will forms dicobaltoctacarbonyl and molybdenum will form molybdenumhexacarbonyl. Both of these compounds are unstable, and will decompose readily into the zero valent metal and carbon monoxide gas, and hence will not render carbon monoxide or metal surface catalysts unusable. Rather, the formation of carbonyl in-situ may possibly provide a reaction pathway for carbon monoxide based reduction.

While the catalyst may be sulfided, it is contemplated that the catalyst is a non-sulfided catalyst when the stream is carbon monoxide rich and does not contain much hydrogen. Triglycerides, being low on sulfur, may cause leaching of sulfur from sulfided catalyst and the high oxygen content will damage the sulfide structure of the catalyst. Additionally, studies have revealed that poly-condensation products formed have shortened the life by deactivation. Alumina, in this context, is quite susceptible to deactivation by coke formation. However, when the gas comprises hydrogen and carbon monoxide, it is preferred that the catalyst is partially sulfided so that the hydrogen consumption from any side reactions due to lack of catalyst activity is minimized.

Additionally, it is contemplated that sulfiding can be used to tune the activity of the catalyst. The carbon monoxide present may react to some extent with the sulfur to form COS, which could be removed by amine wash or adsorption. In order to maintain the catalyst in a partially sulfided state, sulfur may be added to the feedstock 10 or may be introduced into the reactor 14 separately from the feedstock 10.

Generally, decarboxylation and/or deoxygenation conditions include a relatively low pressure of 3447 kPa (500 psia) to 6895 kPa (1000 psia), a temperature of 200 to 400° C. (392 to 752° F.) and a liquid hourly space velocity of 0.5 to 10 $hr^{-1}$. In another embodiment the decarboxylation conditions include the same relatively low pressure of 3447 kPa (500 psia) to 6895 kPa (1000 psia), a temperature of 288 to 345° C. (550 to 653° F.) and a liquid hourly space velocity of 1 to 4 $hr^{-1}$.

Since hydrogenation is an exothermic reaction, as the feedstock flows through the catalyst bed the temperature increases and decarboxylation and deoxygenation may begin to occur. Thus, it is envisioned and is within the scope of this invention that all the reactions occur simultaneously in one reactor or in one bed. Alternatively, the conditions can be controlled such that hydrogenation primarily occurs in one bed and decarboxylation and/or deoxygenation occurs in a second bed. Of course if only one bed is used, then hydrogenation occurs primarily at the front of the bed, while decarboxylation/deoxygenation occurs mainly in the middle and bottom of the bed. Finally, desired hydrogenation can be carried out in one reactor, while decarboxylation and/or deoxygenation can be carried out in a separate reactor.

Returning to FIG. 1, an effluent 20 from the first reaction zone 12 is introduced to a separation zone 21 having a phase. Hydrogen, carbon oxides, possibly hydrogen sulfide and $C_3$-hydrocarbons are separated and removed in line 24 and liquid hydrocarbons are removed in line 26. Water may also be removed from the phase separator 22 in a line 28. Alternatively, although not depicted as such, the water may be removed as a vapor in line 24.

Since the vapor in line 24 from the phase separator 22 comprises a large quantity of hydrogen and carbon monoxide it may be used as a recycle gas stream. The carbon dioxide in the vapor in line 24 can be removed from the hydrogen and carbon monoxide in a scrubbing zone 30. The scrubbing zone 30 may comprise any well-known systems in the art, such as reaction with a hot carbonate solution, pressure swing adsorption, absorption with an amine in processes, etc. If desired, essentially pure carbon dioxide can be recovered by regenerating the spent absorption media. Thus, the vapor in line 24 is passed through one or more scrubbing zones 30 to remove carbon dioxide and hydrogen sulfide and provide a scrubbed recycle gas 32. The scrubbed recycle gas 32 will comprise the $C_3$-hydrocarbons, hydrogen, and carbon monoxide and may be compressed in a recycle gas compressor 34 and used as a recycle gas stream form a portion of the gaseous stream 18. Additionally, a portion of the scrubbed recycle gas may be utilized to isomerize hydrocarbons (discussed below) and can be from a suction or discharge of the recycle gas compressor 34. Furthermore, it is contemplated that a portion of the scrubbed recycled gas is passed back to the reactor 14 in the reaction zone 12 as a quench fluid in line 33 to control the temperature in the reactor 14.

Returning to the phase separator 22, the liquid hydrocarbons removed from the phase separator 22 in line 26 will have poor cold flow properties because it comprises essentially normal paraffins. In order to improve the cold flow properties of the liquid hydrocarbon fraction, the liquid hydrocarbons in line 26 can be passed to an isomerization zone 36. As will be appreciated, the isomerization zone 36 comprises one or more reactors 38 which contain an isomerization catalyst and which are operated under isomerization conditions to at least partially isomerize the normal paraffins to branched paraffins. Additionally, a hydrogen containing gas 40 is also passed to the isomerization zone 36, and as mentioned above, the hydrogen containing gas 40 may comprise a portion of the scrubbed recycle gas 32.

In the isomerization zone 36, only minimal branching of the hydrocarbons is required, enough to overcome cold-flow problems of the normal paraffins. Since attempting for significant branching runs the risk of high degree of undesired cracking, the predominant isomerized product is a mono-branched hydrocarbon. An isomerized effluent 42 of the isomerization zone 36 comprises a branched-paraffin-rich stream. By the term "rich" it is meant that the isomerized effluent 42 has a greater concentration of branched paraffins than the hydrocarbons entering the isomerization zone 36, and preferably comprises greater than 50 mass-% branched paraffins. It is envisioned that the isomerized effluent 42 comprises 70, 80, or 90 mass-% branched paraffins.

The isomerization of the liquid hydrocarbons in line 26 can be accomplished in any manner known in the art or by using any suitable catalyst known in the art. One or more beds of catalyst may be used within the reactor(s) 38 in the isomerization zone 36. It is preferred that the isomerization be operated in a co-current mode of operation. Fixed bed, trickle bed down flow or fixed bed liquid filled up-flow modes are both suitable. See also, for example, US 2004/0230085. Suitable catalysts comprise a metal of Group VIII (IUPAC 8-10) of the Periodic Table and a support material. Suitable Group VIII metals include platinum and palladium, each of which may be used alone or in combination. The support material may be amorphous or crystalline. Suitable support materials may include amorphous alumina, amorphous silica-alumina, ferrierite, ALPO-31, SAPO-I 1, SAPO-31, SAPO-37, SAPO-41, SM-3, MgAPSO-31, FU-9, NU-10, NU-23, ZSM-12, ZSM-22, ZSM-23, ZSM-35, ZSM-48. ZSM-50, ZSM-57, MeAPO-I 1, MeAPO-31, MeAPO-41, MeAPSO-I 1, MeAPSO-31, MeAPSO-41, MeAPSO-46, ELAPO-I1, ELAPO-31, ELAPO-41, ELAPSO-I1, ELAPSO-31, ELAPSO-41, laumontite, cancrinite, offretite, hydrogen form of stillbite, magnesium or calcium form of mordenite, and magnesium or calcium form of partheite, each of which may be used alone or in combination. ALPO-31 is described in U.S. Pat. No. 4,310,440. SAPO-I 1, SAPO-31, SAPO-37, and SAPO-41 are described in U.S. Pat. No. 4,440,871. SM-3 is described in U.S. Pat. Nos. 4,943,424; 5,087,347; 5,158,665; and 5,208, 005. MgAPSO is a MeAPSO, which is an acronym for a metal aluminumsilicophosphate molecular sieve, where the metal Me is magnesium (Mg). Suitable MeAPSO-31 catalysts include MgAPSO-31. MeAPSOs are described in U.S. Pat. No. 4,793,984, and MgAPSOs are described in U.S. Pat. No. 4,758,419. MgAPSO-31 is a preferred MgAPSO, where 31 means a MgAPSO having structure type 31. Many natural zeolites, such as ferrierite, that have an initially reduced pore size can be converted to forms suitable for olefin skeletal isomerization by removing associated alkali metal or alkaline earth metal by ammonium ion exchange and calcination to produce the substantially hydrogen form, as taught in U.S. Pat. Nos. 4,795,623 and 4,924,027. Further catalysts and conditions for skeletal isomerization are disclosed in U.S. Pat. Nos. 5,510,306, 5,082,956, and 5,741,759.

The isomerization catalyst may also comprise a modifier selected from the group consisting of lanthanum, cerium, praseodymium, neodymium, samarium, gadolinium, terbium, and mixtures thereof, as described in U.S. Pat. Nos. 5,716,897 and 5,851,949. Other suitable support materials include ZSM-22, ZSM-23, and ZSM-35, which are described for use in dewaxing in U.S. Pat. No. 5,246,566 and in the article entitled "New molecular sieve process for lube dewaxing by wax isomerization," written by S. J. Miller, in Microporous Materials 2 (1994) 439-449.

Isomerization conditions may include a temperature between 200 to 400° C. (392 to 752° F.) and a pressure between 1724 kPa absolute (250 psia) to 4726 kPa absolute (700 psia). In another embodiment the isomerization conditions include a temperature between 300 to 360° C. (572 to 680° F.) and a pressure between 3102 kPa absolute (450 psia) to 3792 kPa absolute (550 psia). Other operating conditions for the isomerization zone are well known in the art.

The isomerized effluent 42 may be passed to a separator vessel 44 to separate liquids and vapor, with the vapor being withdrawn in a line 46 and the liquid being withdrawn in a line 48. As the vapor in line 46 may comprise hydrogen and carbon monoxide, it may passed as a recycle gas stream to scrubbing zone(s) 30 (discussed above) which provide the scrubbed recycle gas 32. Although it is depicted that the two recycle gas streams are combined, this is merely a preferred embodiment.

The liquid 48 from the separator vessel 44 can be passed to a fractionation zone 50 having one or more fractionation columns 52 to separate one or more transportation fuels streams 54 from a bottoms stream 56. Additionally, other streams may likewise be withdrawn from the fractionation columns 52, including for example, a naphtha stream, propane, butane, pentane, and LPG streams to name a few.

The transportation fuel stream 54 preferably comprises a side draw stream from the fractionation column 52 and in most preferred embodiment comprises a diesel boiling range fuel stream. The bottoms stream 56 from the fractionation column 52 may comprise partially unconverted glycerides. Thus, the bottoms stream may be to reaction zone 12 as the partially unconverted feed 10a (discussed above). Additionally, a portion of the bottoms stream 56 from the fractionation column 52 may also be used as cool quench liquid between beds of one of the reaction zone 12 to further control the heat of reaction and provide quench liquid for emergencies. The recycle stream may be introduced to the inlet of one the reaction zone 12 and/or to any subsequent beds or reactors. One benefit of the hydrocarbon recycle is to control the temperature rise across the individual beds.

With reference to FIG. 2, another embodiment of the present invention is shown, in which the fractionation zone 50 is disposed between the phase separator 22 of the separation zone 21 and the isomerization zone 36.

In this embodiment, the liquid hydrocarbons in line 26 are passed first to the fractionation zone 50 in which one or more columns 52 will separate the liquid hydrocarbons into a heavy effluent 60 and a light effluent 62. The heavy effluent 60 will comprise some unconverted feed and therefore may be used as a quench fluid, as a partially unconverted feed 10a or both, similar to the bottoms stream 56 discussed above in regards to FIG. 1.

The light effluent stream 62 comprises diesel range hydrocarbons and lighter compounds. Thus, the light effluent stream 62 is passed to the isomerization zone 36 to improve the cold flow properties of the diesel range hydrocarbons.

The isomerization zone 36 is described in detail above with respect to the embodiments shown in FIG. 1.

From the isomerization zone 36, the isomerized effluent 42 can be passed to the separator vessel 44 in which the isomerized effluent 42 will separate with the vapor being withdrawn in the line 46 and the liquid being withdrawn in the line 48. The gaseous component in line 46 can be used as a recycle gas stream as discussed above. The liquid in line 48 may comprise the desired transportation fuel, preferably, a diesel boiling range fuel. Additionally, other streams may be separated from either the gaseous component or the liquid component, such as, a naphtha, propane, butane, pentane, or LPG stream to name a few.

EXPERIMENTAL EXAMPLES

Various experimental examples were conducted using a feed, derived from soybean oil, having approximately 11% by mass $C_{16}$ hydrocarbons and approximately 84% by mass $C_{18}$ hydrocarbons with a cobalt/molybdenum catalyst. The reactor pressure was 10.34 MPa (1500 psig) and a temperature of 300° C. (572° F.) was utilized.

TABLE 1

|  | 1 $H_2$ | 2 $H_2$ | 3 CO | 4 1:1 $H_2$:CO | 5 1:3 $H_2$:CO | 6 1:1 $H_2$:CO |
|---|---|---|---|---|---|---|
| Paraffin yield (wt-%) | 92.30% | 93.55% | 18.52% | 55.86% | 31.45% | 75.89% |
| Partially converted feed (wt-%) | 6.72% | 6.15% | 78.14% | 43.51% | 67.63% | 22.88% |
| $C_{16}$ in liquid product v feed $C_{16}$ | 85.59% | 86.34% | 10.28% | 97.75% | 76.49% | 93.96% |
| $C_{18}$ in liquid product v feed $C_{18}$ | 91.15% | 93.10% | 6.07% | 85.04% | 55.10% | 85.44% |
| $C_{16}$ v $C_{15}$ in liquid product | 88.22% | 89.03% | 34.69% | 85.94% | 60.45% | 86.45% |
| $C_{18}$ v $C_{17}$ in liquid product | 87.25% | 88.37% | 33.62% | 83.22% | 55.96% | 83.65% |

The results of the various experiments were compared with pure hydrogen run in terms of triglyceride conversion, partially converted feed, paraffin yield, % of $C_{16}$ and $C_{18}$ hydrocarbons retained from feed in liquid product and $C_{16}$, $C_{18}$ hydrocarbons selectivity with respect to $C_{15}$ and $C_{17}$ hydrocarbons, respectively, in the liquid product. Yields, calculated based on renormalizing data for the components in the liquid product, excluding partially converted/unconverted feed ($C_{19}$ to $C_{24}$ hydrocarbons to triglycerides), show comparable results for $H_2$:CO relative to pure $H_2$.

From Table 1, experiments 1 and 2 were conducted with hydrogen. In contrast, experiment 3 was conducted with CO. Based upon the data in Table 1, under these conditions pure CO demonstrated the ability to deoxygenate, however the results indicate the deoxygenation performance of pure CO under the chosen conditions is inferior to that of hydrogen and leaves open the possibility that different operating conditions of temperature and pressure would be needed for effective deoxygenation using pure CO.

Additionally, for experiment 4, a 1:1 ratio of $H_2$ to CO was utilized. The molar $H_2$ % of stoichiometry is less compared to experiments 1 and 2 which utilized pure hydrogen. However, from the data shown above in Table 1, the selectivity and retention (w.r.t. feed) of $C_{16}$ and $C_{18}$ hydrocarbons are comparable to experiments 1 and 2. The slightly lesser value is believed to be a result of an inconsistent supply of gas, and inconsistent pressure imposed by the limitations of the equipment used. Furthermore, experiment 5 utilized a 1:3 ratio of $H_2$ to CO, however the mole $H_2$ % of stoichiometry is further less compared to the experiments 1 and 2 which utilized hydrogen.

Experiment 6 was similar to experiment 4 except for the feed stock was reduced by half to match the stoichiometry of experiments 1 and 2. As can be seen in Table 1, for experiment 6, there is an improved paraffin yield and conversion compared to experiments 3-5. Additionally, the retention and selectivity is again better, and comparable to experiments 1 and 2 which utilized hydrogen. Finally, in these experiments, the pressure was not constant and hydrogen supply was also not constant. Those of ordinary skill in the art would infer that with a controlled pressure and continuous gas supply, the results should significantly improve. Based upon the above, it is contemplated that the ratio of $H_2$ to CO is between 50:50 to 99:1, or is between 50:50 to 80:20, or is approximately 50:50.

In sum, the use of a mixture of carbon monoxide and hydrogen may be used to lower the hydrogen demand associated with the conversion of renewable feedstocks to transportation fuels. Additionally, by using less hydrogen, less water is produced, and there is a lower chance of damage to downstream catalysts that are sensitive to water.

It should be appreciated and understood by those of ordinary skill in the art that various other components such as valves, pumps, filters, coolers, etc. were not shown in the drawings as it is believed that the specifics of same are well within the knowledge of those of ordinary skill in the art and a description of same is not necessary for practicing or understating the embodiments of the present invention.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. A process for producing a transportation fuel from a renewable feedstock comprising:
    passing a liquid stream comprising oil derived from a biomass to a reaction zone;
    passing a gaseous stream comprising a molar ratio of hydrogen to carbon monoxide of between 50:50 to 99:1 to the reaction zone;
    operating the reaction zone under conditions to remove oxygen from the oil and to hydrogenate the oil to provide an effluent; and,
    isomerizing at least a portion of the effluent to increase a cold flow property of the at least a portion of the effluent.

2. The process of claim 1 wherein the gaseous stream comprises a molar ratio of hydrogen to carbon monoxide of between 50:50 to 80:20.

3. The process of claim 1 wherein the gaseous stream comprises synthesis gas.

4. The process of claim 3 wherein the synthesis gas is produced from a biomass.

5. The process of claim 1 wherein the gaseous stream comprises a steel production gaseous stream.

6. The process of claim 1 wherein the gaseous stream comprises a refinery gas stream.

7. The process of claim 1 wherein the transportation fuel comprises green diesel.

8. A process for producing a transportation fuel from a renewable feedstock comprising:
    passing a renewable feedstock to a deoxygenation zone, the renewable feedstock comprising vegetable oil;
    passing a gaseous stream comprising a molar ratio of hydrogen to carbon monoxide of between 50:50 to 99:1 to the deoxygenation zone;
    deoxygenating the renewable feedstock in the deoxygenation to remove oxygen from the vegetable oil and to hydrogenate the vegetable oil and to provide a deoxygenated effluent;
    separating the deoxygenated effluent into a recycle gas and a liquid effluent, wherein the recycle gas forms a portion of the gaseous stream;
    isomerizing at least a portion of the liquid effluent to provide an isomerized effluent; and,
    separating a transportation fuel from at least a portion of the isomerized effluent.

9. The process of claim 8 further comprising:
    separating the liquid effluent into a heavy effluent and a light effluent, the light effluent comprising the portion of the liquid effluent that is isomerized.

10. The process of claim 9 further comprising:
    mixing at least a portion of the heavy effluent with the renewable feedstock to form a combined feed.

11. The process of claim 9 further comprising:
    quenching the deoxygenation zone with at least a portion of the heavy effluent.

12. The process of claim 8 further comprising:
    separating the isomerized effluent into a second recycle gas stream and a liquid isomerized effluent, wherein the second recycle gas forms a portion of the gaseous stream.

13. The process of claim 12 further comprising:
    separating the liquid isomerized effluent into a product and a bottoms, wherein the product comprises a transportation fuel.

14. The process of claim 13 further comprising:
    mixing at least a portion of the bottoms with the renewable feedstock to form a combined feed.

15. The process of claim 13 further comprising:
    quenching the deoxygenation zone with at least a portion of the bottoms, with a recycle gas stream, or both.

16. The process of claim 8 further comprising:
    removing carbon dioxide from the recycle gas to provide a carbon dioxide lean gaseous stream, wherein the carbon dioxide lean gaseous stream forms a portion of the gaseous stream.

17. The process of claim 16 further comprising:
    passing a portion of the carbon dioxide lean gaseous stream to an isomerization zone; and,
    isomerizing at least a portion of the liquid effluent to increase a cold flow property of the at least a portion of the liquid effluent in the isomerization zone to provide an isomerized effluent.

18. The process of claim 8 wherein at least a portion of the gaseous stream comprises synthesis gas.

19. A process for producing a transportation fuel from a renewable feedstock comprising:

passing a liquid stream comprising oil derived from a biomass to a reaction zone;

passing a gaseous stream comprising a molar ratio of hydrogen to carbon monoxide of between 50:50 to 99:1 to the reaction zone, wherein the gaseous stream is nitrogen free;

operating the reaction zone under conditions to remove oxygen from the oil and to hydrogenate the oil to provide an effluent; and, isomerizing at least a portion of the effluent to increase a cold flow property of the at least a portion of the effluent.

* * * * *